(No Model.)
C. V. TOUHY.
DITCHING MACHINE.
No. 375,025. Patented Dec. 20, 1887.
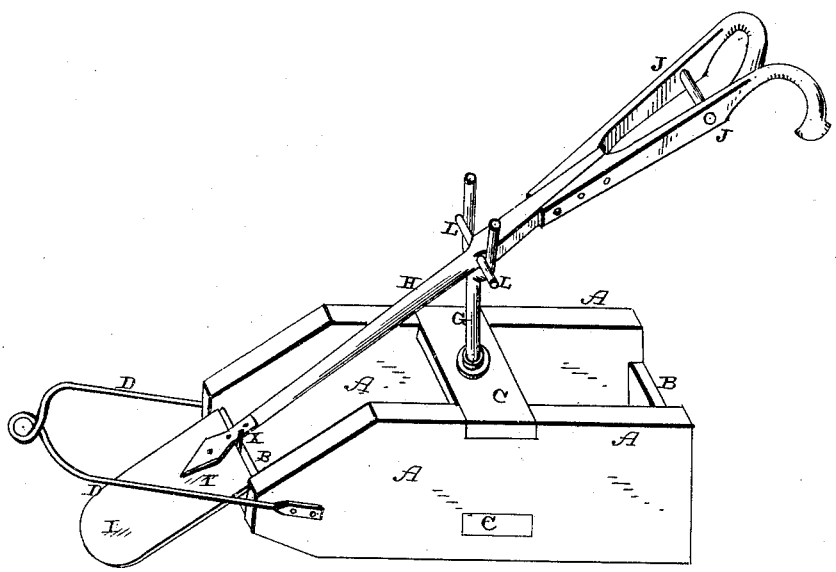
Witnesses.
L. L. Gardner
Edm. P. Ellis
Inventor.
C. V. Touhy,
per F. A. Lehmann,
Atty.

UNITED STATES PATENT OFFICE.

CORNELIUS V. TOUHY, OF LOCKSBURG, ARKANSAS.

DITCHING-MACHINE.

SPECIFICATION forming part of Letters Patent No. 375,025, dated December 20, 1887.

Application filed August 6, 1887. Serial No. 246,326. (No model.)

*To all whom it may concern:*

Be it known that I, CORNELIUS V. TOUHY, of Locksburg, in the county of Sevier and State of Arkansas, have invented certain new and useful Improvements in Ditching-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in ditching-machines; and it consists in the combination of a sled-like frame, which is drawn along the ground where the ditch is being cut, a suitable pivoted support which passes down through the frame, and a handle of suitable construction provided with a shovel of any suitable kind upon its lower end, as will be more fully described hereinafter.

The object of my invention is to produce a ditching-machine at a small cost and which is especially adapted for working small ditches, either upon level land or upon the hillside, and by means of which the earth can be excavated and thrown to either side of the ditch.

The accompanying drawing represents a perspective of a ditching-machine embodying my invention.

A A represent two runners, which are rigidly secured together at their ends by the two cross-pieces B and by the two supports C at or near their centers. To the front end of this frame is connected a bail, D, to which the draft-animal is fastened for the purpose of drawing the frame along the ditch.

Passed down through the two supports C is the pivoted or swiveled support G, which forms a support for the lever H, having the shovel I secured to its lower end. To the upper end of this lever are secured the two handles J, by means of which the operator operates the shovel. In order to prevent the pressure of the ground against the lower end of the shovel from forcing the lever up through the support, a suitable catch, X, will be attached to the front cross-piece B, which will receive the pressure of the shovel while being filled. The pin L is used to prevent the lever H from being displaced while emptying the shovel.

The ground is first plowed the width the ditch is to be dug, and then the horse is attached to the ditching-machine. The slide and animal both keep in the ditch, and when the shovel is filled with dirt the operator presses down on the handles and the shovel is raised up between the bail, turned on the pivot, and emptied on one side.

Having thus described my invention, I claim—

1. The combination of the runners provided with the supporting cross-pieces, the support G, the lever H, provided with pin L and shovel I, and the bail D, substantially as shown.

2. The combination of the runners A, connected together by the cross-pieces B and supports C, the bail D, the vertical swiveled support G, branched at its top, the lever H, provided with the shovel I and pin L, and the stop-pin X, substantially as described.

In testimony whereof I affix my signature in presence of two witnesses.

CORNELIUS V. TOUHY.

Witnesses:
ELIAS BROWN,
LOUIS L. MULKEY.